I. B. ANDERSON.
VEHICLE BODY.
APPLICATION FILED JULY 5, 1918.

1,284,967.

Patented Nov. 19, 1918.
5 SHEETS—SHEET 1.

Witnesses
H. D. Kilgore
E. C. Wells

Inventor
Ivar B. Anderson
By his Attorneys
Williamson Murchand

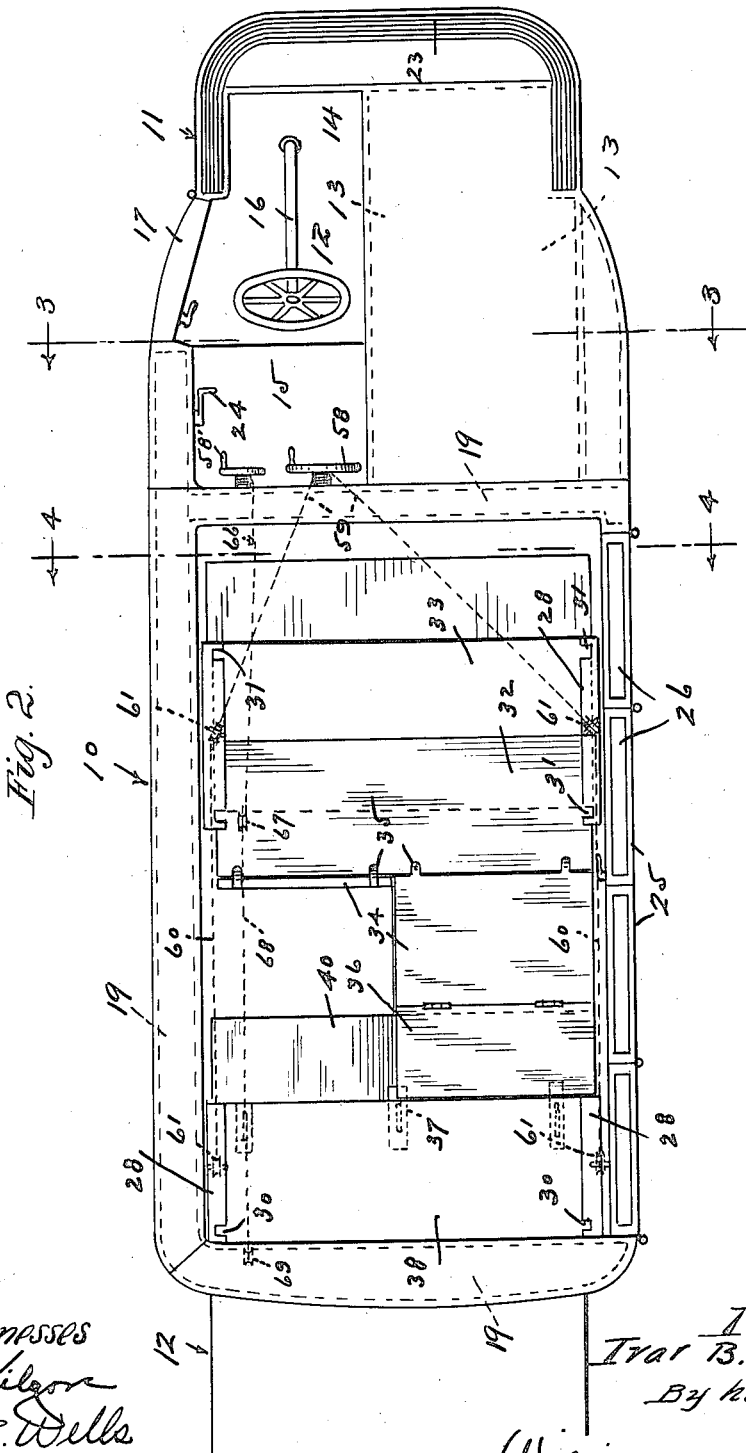

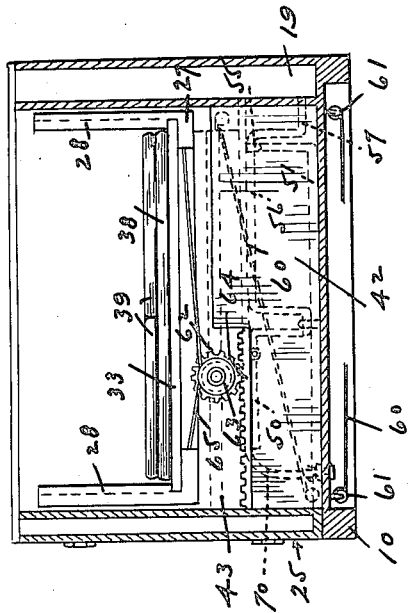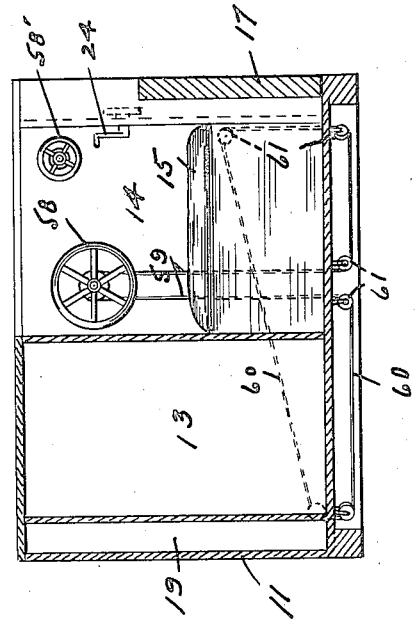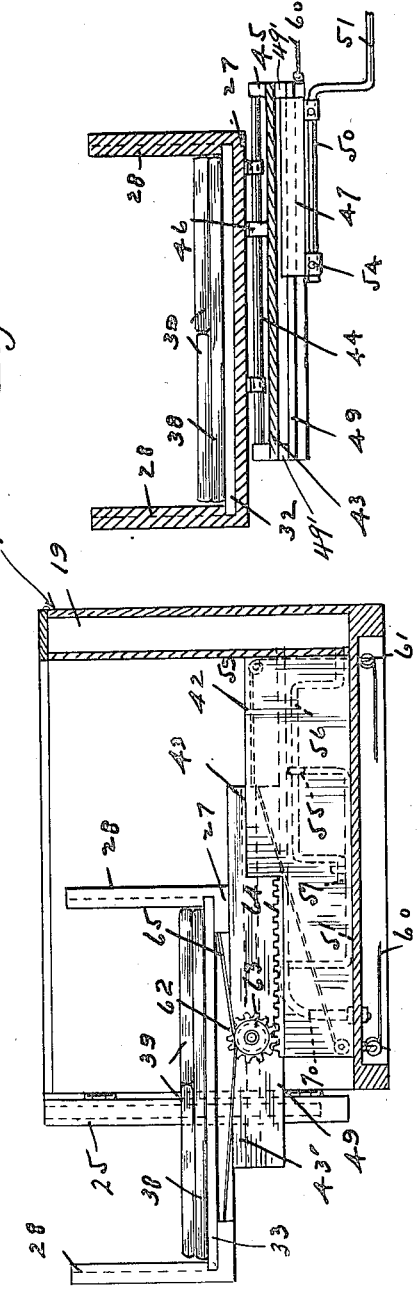

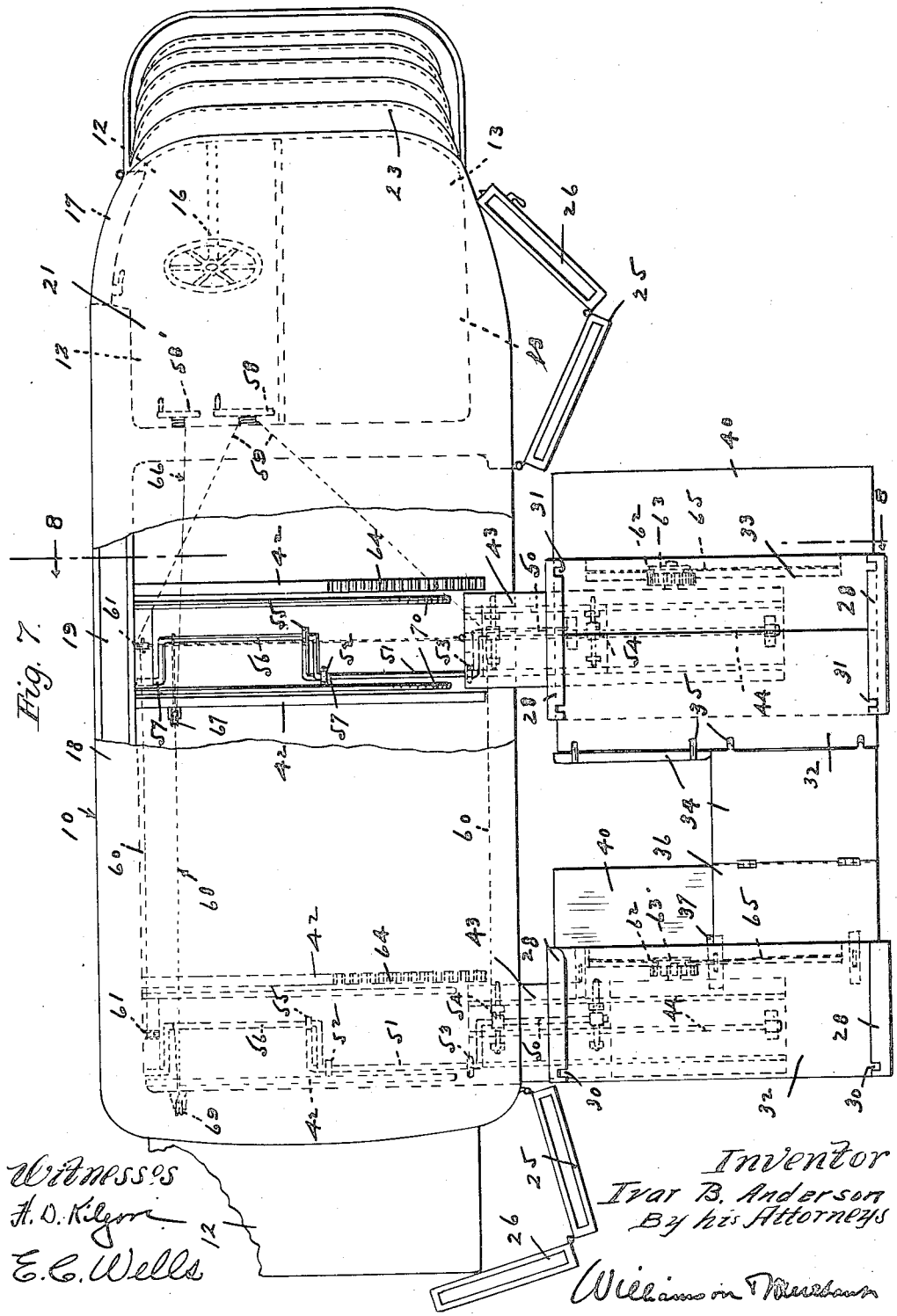

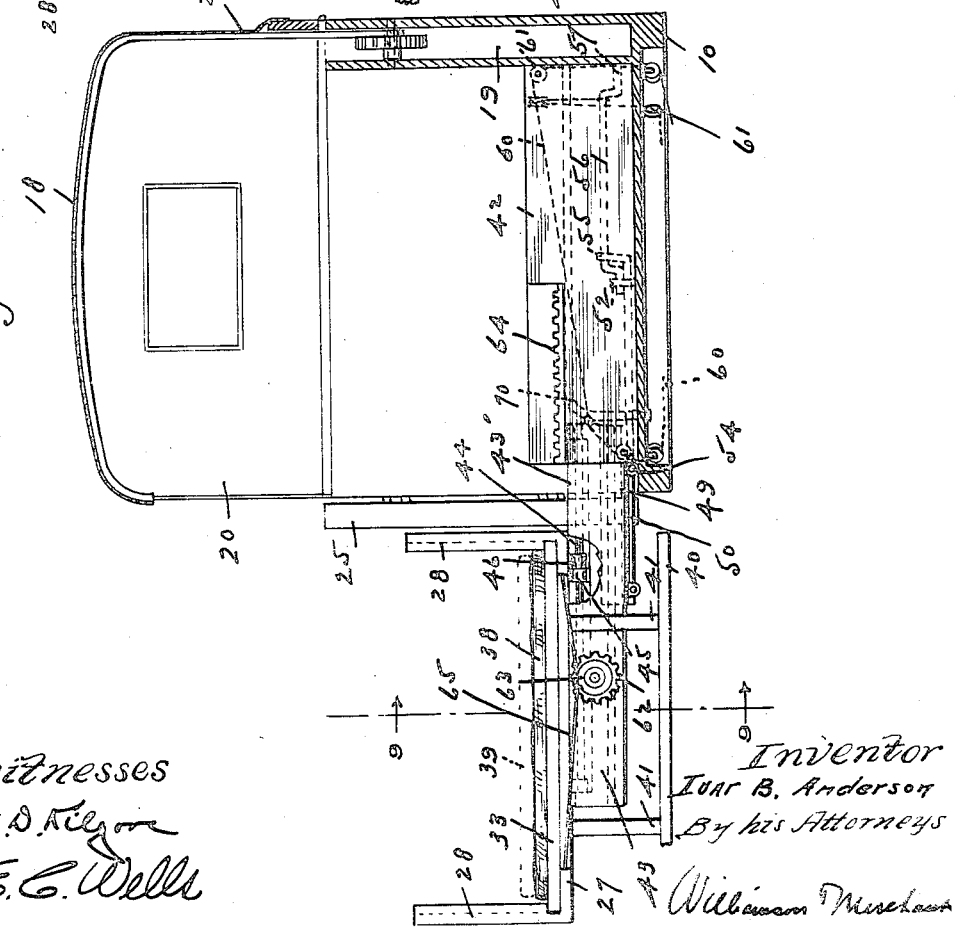

UNITED STATES PATENT OFFICE.

IVAR B. ANDERSON, OF DARWIN, MINNESOTA.

VEHICLE-BODY.

1,284,967.   Specification of Letters Patent.   Patented Nov. 19, 1918.

Application filed July 5, 1918. Serial No. 243,376.

*To all whom it may concern:*

Be it known that I, IVAR B. ANDERSON, a subject of the King of Sweden, residing at Darwin, in the county of Meeker and State of Minnesota, have invented certain new and useful Improvements in Vehicle-Bodies; and I do hereby declare the following to be a full, clear, and exact description of the invention, such as will enable others skilled in the art to which it appertains to make and use the same.

My invention relates to improvements in vehicle bodies; and, to this end, it consists of the novel devices and combinations of devices hereinafter described and defined in the claims.

In the accompanying drawings, which illustrate the invention, like characters indicate like parts throughout the several views.

Referring to the drawings,

Fig. 2 is a plan view of the invention as shown in Fig. 1, with the exception that the top, supplemental top and wind shield are lowered and the seat cushions removed;

Fig. 3 is a transverse section taken on the line 3—3 of Fig. 2;

Fig. 4 is a transverse section taken on the line 4—4 of Fig. 2;

Fig. 5 is a view corresponding to Fig. 4, with the exception that the side doors are open and the seats partly projected outward of the body;

Fig. 6 is a central transverse section of the seat shown in Fig. 5;

Fig. 7 is a plan view of the invention as shown in Fig. 1, with the exception that the side doors are open and the seats projected entirely outside of the vehicle, with some parts broken away;

Fig. 8 is a transverse section taken on the line 8—8 of Fig. 7; and

Fig. 9 is a longitudinal section taken on the line 9—9 of Fig. 8, on an enlarged scale.

Figure 1:
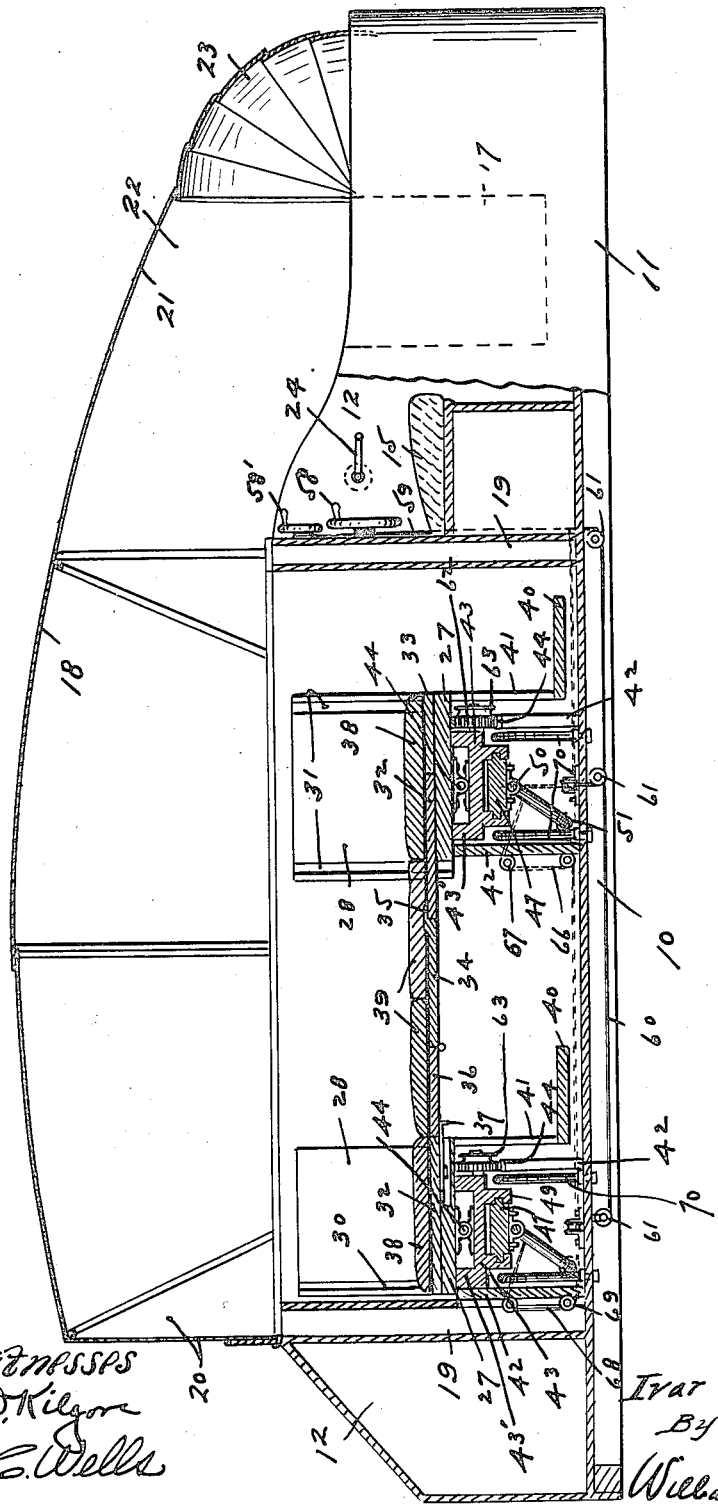
Figure 1 is a view principally in longitudinal central section illustrating the invention with the top, supplemental top and wind shield raised, and also illustrating the seats adjusted to form a single bed.

The numeral 10 indicates the main vehicle body having a forward extension 11 and a rear extension 12, and which latter extension affords a storage compartment. A longitudinal partition in the front body extension 11 divides said extension into an engine compartment 13 and a compartment 14 for the driver. The compartment 14 is provided with a single seat 15, just rearward of the steering wheel 16 and is also provided with a left-hand door 17. A transversely divided folding top 18 is provided for the main body 10 and the sections thereof are adapted to be folded into compartments 19 formed in the front, rear and left-hand walls of the main body 10. Suitable side and rear curtains 20 are also provided for the main body 10. A supplemental top 21 is provided for the front body extension 11, together with side curtains 22. This supplemental top 21 is attached to the front section of the main top 18 and is adapted to be folded therewith, together with the side curtains 22, into the respective compartments 19. A folding wind shield 23 is also provided for the front extension 11 and the supplemental top 21, when raised, is attached thereto. Suitable operation connections, including a crank 24, are provided for raising the top sections 18.

The entire right-hand side of the main body 10 is normally closed by four doors 25. The two outer doors of these doors 25 are hinged to the ends of the main body 10 and the two intermediate of said doors are hinged to the two outer doors. Obviously, by thus hinging the doors 25, the entire right-hand side of the main body 10 is unobstructed, when the doors are open. Vertically sliding windows 26 are mounted in pockets formed in the doors 25, and, when raised, coöperate with the top sections 18 and curtains 20 to inclose the main body 10.

The parts thus far described are fully described and broadly claimed in my co-pending application, entitled "Vehicle bodies and tops", filed of even date herewith, under S. N. 243,377.

Mounted in the main body 10, are front and rear seat structures identical, the one with the other, with the exception that the front seat structure is located sufficiently rearward of the front wall of the main body 1 to permit persons occupying said seat to ride facing either forward or backward and the back structure thereof can be shifted, at will, either to the front or rear longitudinal edges of the seat cushion. As the two seat structures are substantially identical, the description of the one will suffice for the other.

The numeral 27 indicates a seat bottom having rigidly secured thereto end members 28. Formed in the seat end members 28, just above the seat bottom 27, are horizontal grooves 29 and in the vertical rear edges of the rear seat end members are vertical grooves 30. Grooves 31, like the grooves 30, are formed in the front and rear vertical edge portions of the end members of the front seat. A combined back and bed bottom member 32 is provided for each seat and when used for a back, said members are supported in the groove 30 of the back seat or in either set of grooves 31, depending on which way the occupants of the front seat are to face. When the members 32 are used as a bed bottom, they are mounted in the grooves 29 and rest directly upon the seat bottoms 27. Coöperating with the members 32, to complete the bed bottom, is a relatively narrow member 33, and, when in use, is mounted in the grooves 29 of the front seat and at the front edge thereof. When not in use, this member 33 can be stored in any convenient place. Also coöperating with the members 32 and 33, are two relatively short members 34, and, when placed end to end, are of the same length as said members 32 and 33. Each bed bottom member 34 is independently and detachably connected by hinges 35 to the rear edge of the front seat member 32 and hinged to the other edge, is a relatively narrow member 36 loosely supported on lugs 37 slidably attached to the adjacent member 32. The hinges connecting the members 34 and 36 are so arranged as to support said members in a horizontal position. By making the members 34 and 36 in half lengths, the seats may be arranged to form a single bed or twin beds. When arranged to form a single bed, which is at the right-hand side of the body, the left-hand member 34 may be folded down on its hinges and the attached member 36 folded back thereof. With the left-hand members 34 and 36 turned down, the portions of the front and rear may be used by sitting beside the single bed. Main seat cushions 38 are provided for the seat bottom 27 and half cushions 39 are provided for the backs of the seats. When the seats are arranged to form twin beds, the cushions 38 and 39 are placed on the bed bottom with the half cushions 39 between the main cushions 38. When the seats are arranged to form only a single bed, only two of the half cushions 39 are used and the other thereof are placed on top of the main cushions 38, at the side of the single bed. Each seat bottom 27 is provided, forward thereof, with a foot board 40 rigidly secured thereto by hangers 41.

A pair of combined supports and rails 42 is provided for supporting each seat bottom 27. These rails 42 extend transversely the full width of the body 10, are permanently and rigidly secured to the foot thereof, and are of such height as to support the seat bottoms the desired height above said floor.

Under each seat bottom 27, is a secondary carrier 43 for imparting endwise movement thereto and for supporting the same, when said seat bottom is projected outside of the body 10, as shown in Fig. 8. This secondary carrier 43 is provided at its longitudinal edges with a pair of rails 43' on which the seat bottom 27 rests. A rod 44 is provided for securing the seat bottom 27 to the secondary carrier 43, with freedom for endwise movement on the rails 43'. This rod is rigidly secured by lugs 45 to the secondary carrier 43 and lugs 45, and lugs 46 slidably connect the same to the seat bottom 27.

The secondary carrier 43 is supported on a primary carrier 47. This primary carrier 47 is relatively short and has on its longitudinal sides tongues 48 slidably mounted in grooves formed in depending rails 49 on the bottom of the secondary carrier 43. This primary carrier 47 is supported on a crank 50 formed in the outer right-hand end of a shaft 51 journaled in a center bearing 52 and a right-hand bearing 53, with freedom for endwise sliding movement transversely of the body 10. The crank 50 is journaled in bearings 54 secured to the under side of the primary carrier 47, with a limited movement transversely of said carrier. The purpose of these movable bearings 54 is to permit a true vertical movement of the primary carrier 47 on the crank 50, during the raising and lowering of the seat. On the inner end of the shaft 51, is an off-set eye 55 axially alined with the crank 50. This eye 55 receives and is slidably mounted on an intermediate crank 56, having short trunnions 57, which are approximately alined with the shaft 51. The right-hand trunnion 57 is journaled in the bearing 52 and the left-hand trunnion is journaled in the left-hand side of the body 10. Obviously, the eye 55 connects the two cranks 50 and 56 for common oscillatory movement and, at the same time, it permits endwise movement of the crank 50. Normally the cranks 50 and 56 project forwardly and upwardly at approximately 45 degrees. It is also obvious that the crank 50 supports the primary carrier for raising and lowering movement and for endwise movement transversely of the body 10.

To impart simultaneous endwise movement to both of the secondary carriers 27, there is journaled in the body extension 11, in the vicinity of the driver's seat 15, a hand wheel-equipped windlass drum 58, having attached thereto two main cables 59. These cables 59 are arranged to be reversely wound on the windlass drum 58 and are also attached to the left-hand end of the secondary carrier of the front seat. A pair of branch cables 60 connect the left-hand end of the secondary carrier 43 for the rear seat to the main cables 59. Guide sheaves 61 are provided for the cables 59 and 60 to keep the same in their required position to impart endwise movement to both of the secondary carriers 27.

To impart endwise movement to each seat bottom 27 on the respective secondary carrier 43, there is journaled on said carrier a pinion 62, provided with a windlass drum, which meshes with a rack 64 secured to the front rail 42. A cable 65 is attached at its intermediate portion to the windlass drum 63, extended therearound in reverse directions, and has its ends secured to opposite ends of the secondary carriers 43. (See Figs. 4 and 5).

In projecting the seats from the body 10, they are simultaneously lowered, outward of said body, by the crank 50 to bring the same into relatively close relation to the ground. The normal position of these cranks 50 is such as to tend to move into positions to lower the seats under the action of gravity. To simultaneously operate the crank 50 to lower and raise the seats, there is journaled, close to the windlass drum 58, a similar drum 58′, on which is wound one end of a main cable 66. This cable 66 is extended over a guide sheave 67 and has its other end attached to the crank 56 of the front seat structure. A branch cable 68 connects the other crank 56 to the main cable 66 and runs over a guide sheave 69. To assist in the lowering and raising of the seats, a pair of curved guide rails 70 is rigidly secured under each seat structure and the left-hand ends of the secondary carriers 43 ride thereover, during their lowering and raising movement.

From the above description, it is evident that by operating the windlass drum 58, both seat structures may simultaneously project, when the doors 25 are open, entirely to one side of the body 10. Also by operating the windlass drum 65, both seat structures may be simultaneously lowered. It is also evident that the movement imparted to the secondary carriers 43 will carry the pinions 62 therewith and which pinions are caused to rotate by the fixed racks 64. The rotation of the pinions 62 will operate the cables 65 on the windlass drums 63, and which cables will impart endwise movement to the seat bottoms 27. Obviously, the movement of the seat bottoms 27, either into or out of the body 10, will be much faster than like movements of the secondary carriers 43. As previously stated, the secondary carriers 43 have endwise sliding movement on the primary carriers 47. At the limit of travel of the secondary carriers 43 on the primary carriers 47, in either direction, said secondary carriers pick up the primary carriers and cause the same to move therewith by the engagement of lugs 49′ on the ends of the rails 49 of the secondary carriers with the ends of the primary carriers 47. The endwise movement of the primary carriers 47 carries the cranks 50 therewith.

The lugs 45 and 46 limit the movement of the seat bottoms 27 on the secondary carriers 43.

The improved vehicle body is especially adapted for an ambulance, and the raising and lowering of its seat structures, outside of the body 10, permit said seat structures, when converted into a single or double bed, to be brought into relatively close position to the ground, thus making it extremely easy to lift a person onto or from the bed. When converted into a single bed, it permits one or two persons to ride at the side of the single bed. The invention is also well adapted for travelers, as it affords sleeping accommodations that can be very quickly made up or taken down.

What I claim is:

1. A vehicle body having seat structures adapted to be converted into a single or double bed, and mechanism for moving said seat structures to and from a position at one side of said body.

2. A vehicle body having seat structures adapted to be converted into a single or double bed, and mechanism for moving said seat structures to and from a position at one side of said body, and for lowering and raising the same when outside of said body.

3. A vehicle body having two seat structuses adapted to be converted into a bed and including seat bottoms, secondary carriers supporting the seat bottoms for traveling movement thereon, primary carriers supporting the secondary carriers for traveling movement thereon, means for imparting traveling movement to the secondary carriers, and means carried by the secondary carriers for imparting traveling movement to the seat bottoms.

4. A vehicle body having two seat structures adapted to be converted into a bed and including seat bottoms, secondary carriers supporting the seat bottoms for traveling movement thereon, primary carriers supporting the secondary carriers for traveling movement thereon, means for imparting traveling movement to the secondary carriers, and means carried by the secondary carriers for imparting traveling movement to the seat bottoms, said secondary carriers arranged to impart common traveling movement to the primary carrier at the limit of their traveling movement thereon.

5. A vehicle body having two seat structures adapted to be converted into a bed and including seat bottoms, secondary carriers supporting the seat bottoms for traveling movement thereon, primary carriers supporting the secondary carriers for traveling movement thereon, means for imparting traveling movement to the secondary carriers, means carried by the secondary carriers for imparting traveling movement to the seat bottoms, said secondary carriers arranged to impart common traveling movement to the primary carrier at the limit of their traveling movement thereon, and means for lowering and raising the primary carriers when the seat structures are outside of the vehicle body.

6. A vehicle body having two seat structures adapted to be converted into a bed and including seat bottoms, secondary carriers supporting the seat bottoms for traveling movement thereon, primary carriers supporting the secondary carriers for traveling movement thereon, means for imparting traveling movement to the secondary carriers, means carried by the secondary carriers for imparting traveling movement to the seat bottoms, said secondary carriers arranged to impart common traveling movement to the primary carrier at the limit of their traveling movement thereon, and cranks for lowering and raising the primary carriers when the seat structures are outside of the vehicle body.

7. A vehicle body having two seat structures adapted to be converted into a bed and including seat bottoms, secondary carriers supporting the seat bottoms for traveling movement thereon, primary carriers supporting the secondary carriers for traveling movement thereon, means for imparting traveling movement to the secondary carriers, means carried by the secondary carriers for imparting traveling movement to the seat bottoms, said secondary carriers arranged to impart common traveling movement to the primary carrier at the limit of their traveling movement thereon, cranks for lowering and raising the primary carriers when the seat structures are outside of the vehicle body, and means for operating the cranks from a distant point.

8. A vehicle body having two seat structures adapted to be converted into a bed and including seat bottoms, secondary carriers supporting the seat bottoms for traveling movement thereon, primary carriers supporting the secondary carriers for traveling movement thereon, means for imparting traveling movement to the secondary carriers, means carried by the secondary carriers for imparting traveling movement to the seat bottoms, said secondary carriers arranged to impart common traveling movement to the primary carrier at the limit of their traveling movement thereon, and cranks for lowering and raising the primary carriers when the seat structures are outside of the vehicle body, said cranks being mounted for traveling movement with the primary carriers.

9. A vehicle body having seat structures adapted to be converted into a bed and having removable backs adapted to form part of the bottoms of the bed, and mechanism for moving the seat structures to and from a position at one side of said body.

In testimony whereof I affix my signature in presence of two witnesses.

IVAR B. ANDERSON.

Witnesses:
P. RODANGE,
D. N. THARALSON.